(12) United States Patent
Bloom et al.

(10) Patent No.: US 10,253,132 B2
(45) Date of Patent: Apr. 9, 2019

(54) RENEWABLE SOURCE-DERIVED POLYMER OIL MACROINITIATORS AND THERMOPLASTIC BLOCK COPOLYMERS DERIVED THEREFROM

(71) Applicant: Archer Daniels Midland Company, Decatur, IL (US)

(72) Inventors: Paul Bloom, Forsyth, IL (US); Erik Hagberg, Decatur, IL (US)

(73) Assignee: Archer Daniels Midland Company, Decatur, IL (US)

( * ) Notice: Subject to any disclaimer, the term of this patent is extended or adjusted under 35 U.S.C. 154(b) by 50 days.

(21) Appl. No.: 15/548,844

(22) PCT Filed: Feb. 9, 2016

(86) PCT No.: PCT/US2016/017077
§ 371 (c)(1),
(2) Date: Aug. 4, 2017

(87) PCT Pub. No.: WO2016/130504
PCT Pub. Date: Aug. 18, 2016

(65) Prior Publication Data
US 2018/0030193 A1  Feb. 1, 2018

Related U.S. Application Data

(60) Provisional application No. 62/113,651, filed on Feb. 9, 2015.

(51) Int. Cl.
*C08F 242/00* (2006.01)
*C08F 8/18* (2006.01)
*C08F 293/00* (2006.01)
*C11C 3/00* (2006.01)
*C08L 95/00* (2006.01)
*C09F 7/00* (2006.01)

(52) U.S. Cl.
CPC ........ *C08F 293/005* (2013.01); *C08F 242/00* (2013.01); *C08L 95/00* (2013.01); *C09F 7/00* (2013.01); *C11C 3/00* (2013.01); *C08F 2438/01* (2013.01); *C08L 2555/32* (2013.01); *C08L 2555/82* (2013.01); *C08L 2555/84* (2013.01)

(58) Field of Classification Search
CPC .................................. C08F 242/00; C08F 8/18
See application file for complete search history.

(56) References Cited

U.S. PATENT DOCUMENTS

| 3,240,794 A | * | 3/1966 | Bornfleth | ................ C07B 39/00 252/601 |
| 8,080,592 B2 | * | 12/2011 | Kruper, Jr. | ............ C08J 9/0019 521/142 |

FOREIGN PATENT DOCUMENTS

WO    WO-03093404 A1 * 11/2003  ................ C08F 8/04

* cited by examiner

*Primary Examiner* — Vu A Nguyen
(74) *Attorney, Agent, or Firm* — William B. Miller

(57) ABSTRACT

Compositions comprising renewable source derived polymer oil polymerization macroinitiators and multiblock polymer compositions derived therefrom by atom transfer radical polymerization are disclosed. Hard, glossy multiblock copolymers, thermoset multiblock copolymers, thermoplastic block copolymer elastomers, and methods of making and using these types of materials are disclosed.

6 Claims, No Drawings

RENEWABLE SOURCE-DERIVED POLYMER OIL MACROINITIATORS AND THERMOPLASTIC BLOCK COPOLYMERS DERIVED THEREFROM

CROSS-REFERENCE TO RELATED APPLICATION(S)

This application is a national stage entry of International Application No. PCT/US2016/017077, filed Feb. 9, 2016, which itself claims the benefit of U.S. Provisional Patent Application No. 62/113,651, filed Feb. 9, 2015, the contents of which are incorporated by this reference.

TECHNICAL FIELD

The present invention relates to renewable source derived polymer oil polymerization macroinitiators and to thermoplastic multiblock copolymer compositions derived therefrom, and more particularly to hard, glossy multiblock copolymers, thermoset multiblock copolymers, thermoplastic block copolymer elastomers, and to methods of making and using these types of materials.

BACKGROUND OF THE INVENTION

Polymers from vegetable oils have obtained increasing attention as public policy makers and corporations alike have been interested in replacing traditional petrochemical feedstocks due to their environmental and economic impact. In recent years, the cost of renewable source derived monomers has become highly competitive (and in many cases more economical than petrochemical feedstocks). For example, with appropriate modification of soybean oil (such as conjugation of triglycerides, or development of soybean oil types that are particularly suitable for polymerization), the chemical properties, thermal properties, microstructure and morphology, and mechanical/rheological behaviors of soybean oil-based polymers could be fine-tuned to make these biopolymers highly useful in the plastics industry.

To date, some success has been achieved through the application of traditional cationic and free radical polymerization routes to vegetable oils to yield thermoset plastics. Pfister & Larock, Bioresource Technology 101:6200(2010), which is hereby incorporated by reference in its entirety, have researched a variety of polymers, ranging from soft rubbers to hard, tough plastics using cationic copolymerization of vegetable oils, mainly SBO, to produce thermoset plastics with boron triflouride diethyletherate (BFE) as the initiator. Lu et al. synthesized soybean-oil-based waterborne polyurethane films with different properties ranging from elastomeric polymers to rigid plastics by changing the polyol functionality and hard segment content of the polymers (Lu et al., Polymer 46:71 (2005); Lu et al., Progress in Organic Coatings 71:336 (2011), which are hereby incorporated by reference in their entirety). Bunker et al. have reported the use of soybean oil to synthesize different bio-based products such as sheet molding composites, elastomers, coatings, foams, etc. For instance, Bunker et al. were able to synthesize pressure-sensitive adhesives using miniemulsion polymerization of acrylated methyl oleate, a monoglyceride derived from soy bean oil (Bunker et al, International Journal of Adhesion and Adhesives 23:29 (2003); Bunker & Wool, Journal of Polymer Science Part A: Polymer Chemistry 40:451 (2002), which are hereby incorporated by reference in their entirety). The polymers produced were comparable to their petroleum counterparts.

Zhu et al. were able to generate an elastic network based on acrylated oleic methyl ester through bulk polymerization using ethylene glycol as the crosslinker (Zhu & Wool, Polymer 47:8106 (2006), which is hereby incorporated by reference in its entirety). Lu et al. were also able to create thermosetting resins synthesized from soybean oil that can be used in sheet molding compound applications. These resins were synthesized by introducing acid functionality and onto the soybean. The acid groups reacted with divalent metallic oxides or hydroxides forming the sheet, while the carbon-carbon groups are subject to free radical polymerization (Lu et al., Polymer 46:71 (2005), which is hereby incorporated by reference in its entirety). Bonnaillie et al. were able to create a thermoset foam system using a pressurized carbon dioxide foaming process of acrylated epoxidized soybean oil (AESO) (Bonnaillie & Wool, Journal of Applied Polymer Science 105:1042 (2007), which is hereby incorporated by reference in its entirety). Wool et al. were able to synthesize liquid molding resins that were able to be cured into high modulus thermosetting polymers and composites using triglycerides derived from plant oils (U.S. Pat. No. 6,121,398 to Wool et al., which is hereby incorporated by reference in its entirety).

Block copolymers may be thermosetting or thermoplastic with broad areas of application including as rubbers or elastomers; as toughened engineering thermoplastics; as asphalt modifiers; as resin modifiers; as engineering resins; as leather and cement modifiers; in footwear, such as in rubber shoe heels, rubber shoe soles; in automobiles, such as in tires, hoses, power belts, conveyor belts, printing rolls, rubber wringers, automobile floor mats, mud flaps for trucks, ball mill liners, and weather strips; as adhesives, such as pressure sensitive adhesives; in aerospace equipment; as viscosity index improvers; as detergents; as diagnostic agents and supports therefore; as dispersants; as emulsifiers; as lubricants and/or surfactants; as paper additives and coating agents; and in packaging, such as food and beverage packaging materials.

Styrenic block copolymers (SBCs), such as styrene-butadiene type polymers (e.g., styrene-butadiene di-block, SB; styrene-butadiene-styrene tri-block, SBS) of the type sold by Kraton Performance Polymers, Inc. under the Kraton® mark, have historically served the asphalt and footwear industries for years, with markets also in the industries of packaging, pressure sensitive adhesives, packaging materials, pressure sensitive adhesives, tires, packaging materials, footwear, and as a modifier of bitumen/asphalt, which is one of its largest markets.

With the forecast of increasing demand of liquid asphalt for the next decade, a particularly strong need exists for a new type of cost effective, environmentally friendly, viable polymer that can be used as an asphalt modifier in lieu of standard styrene-butadiene type modifiers. The global asphalt market is predicted to reach 118.4 million metric tons by 2015, according to a January 2011 report by Global Industry Analysts, Inc. The asphalt paving industry accounts for the largest end-use market segment of asphalt. With increasing growth in the developing markets of China, India, and Eastern Europe, asphalt will be increasingly needed to construct roadway infrastructure for the next decade. The increased demand for asphalt, along with the need for improved asphalt materials/pavement performance, creates the opportunity for an asphalt modifier.

In this regard, as background, the grade of the asphalt governs the performance of paving mixtures at in-service temperatures. In many cases, the characteristics of bitumen need to be altered to improve its elastic recovery/ductility at low temperatures for sufficient cracking resistance as well as to increase its shearing resistance for sustained loads and/or at high temperatures for rutting resistance. The physical properties of bitumen are typically modified with the addition of SBS polymers to produce an improved asphalt grade that enhances the performance of asphalt paving mixtures. Of the asphalt mixtures that are polymer modified, approximately 80% of polymer modified asphalt uses SBS-type polymers.

Asphalt cement is commonly modified with poly (styrene-block-butadiene-block-styrene) (SBS), a thermoplastic elastomer (TPE). Polymer modification is known to substantially improve the physical and mechanical properties of asphalt paving mixtures. Polymer modification increases asphalt elasticity at high temperatures, as a result of an increased storage modulus and a decreased phase angle, which improves rutting resistance. It also increases the complex modulus, but lowers creep stiffness at low temperatures, thus improving cracking resistance (Isacsson & Lu, "Characterization of Bitumens Modified With SEBS, EVA and EBA Polymer," Journal of Materials Science 4:737-745 (1999), which is hereby incorporated by reference in its entirety). SBS-type polymers are typically added to asphalt pavements when additional performance is desired or when optimizing life-cycle costs is warranted. SBS allows for the production of many specialty mixes including cold mixes, emulsion chip seals, and microsurface mixes.

SBSTPEs are block copolymers (BCPs) comprised of styrene-butadiene-styrene polymer chains that create an ordered morphology of cylindrical glassy polystyrene block domains within a rubbery polybutadiene matrix (Bulatovic et al., "Polymer Modified Bitumen," Materials Research Innovations 16(1):1-6(2012), which is hereby incorporated by reference in its entirety). SBS polymers are thermoplastic, meaning that they can be easily processed as liquids at temperatures higher than their glass transition temperature due to the linear nature of their chains. Upon cooling, the rigid polystyrene end-blocks vitrify and act as anchors for the liquid rubbery domains by providing a restoring force when stretched (FRrEn J. R., Polymer Science and Technology (Prentice Hall, Upper Saddle River, N.J., 2 ed. 2008), which is hereby incorporated by reference in its entirety).

SBS is incorporated into asphalt through mixing and shearing at high temperatures to uniformly disperse the polymer. When blended with asphalt binder, the polymer swells within the asphalt maltene phase to form a continuous tridimensional polymer network (Lesueur, "The Colloidal Structure of Bitumen: Consequences on the Rheology and on the Mechanisms of Bitumen Modification," Advances in Colloid and Interface Science 145:42-82 (2009), which is hereby incorporated by reference in its entirety). At high temperatures, the polymer network becomes fluid yet still provides a stiffening effect that increases the modulus of the mixture. At low temperatures, a crosslinked network within the asphalt redevelops without adversely affecting the low temperature cracking performance due to the elastic properties of the polybutadiene (Airey G. D., "Styrene Butadiene Styrene Polymer Modification of Road Bitumens," Journal of Materials Science 39:951-959 (2004), which is hereby incorporated by reference in its entirety). The resulting performance properties widen the working temperature range of the binder-polymer system.

The butadiene monomer used in SBS is typically derived from petrochemical feedstocks, a byproduct of ethylene production. Unfortunately in light of the aforementioned growth in demand for liquid asphalt, however, the price of butadiene has been rapidly increasing not only due to increases in the price of crude oil, but also due to global market shifts in supply and demand. As shale gas supplies become more abundant, crackers are more commonly using lighter petrochemical feeds such as ethane to produce ethylene and its co-products. However, using lighter feeds lowers butadiene production, thus tightening the supply (Foster, "Lighter Feeds in US Steam Crackers Brings New Attitude Toward On-purpose Butadiene, Propylene Prospects," Platts Special Report: Petrochemicals 1-6 (2011), which is hereby incorporated by reference in its entirety).

As briefly summarized above, vegetable oils have been considered as monomeric feedstocks for the plastics industry in general for over 20 years. To date, moderate success has been achieved through the application of traditional cationic and free radical polymerization routes to vegetable oils to yield thermoset plastics (i.e., plastics which, once synthesized, permanently retain their shape and are not subject to further processing). However, the vast majority of commodity polymers are highly processable thermoplastic materials, and the body of work related to the development of vegetable oil-based alternatives to conventional monomers like butadiene is much more limited.

Recently published US 2013/0184383 A1 to Cochran et al., "Thermoplastic Elastomers Via Atom Transfer Radical Polymerization of Plant Oil" (hereafter, the "'383 Cochran et al." or "Cochran et al." application, hereby incorporated by reference in its entirety together with any publications incorporated by reference in turn by Cochran et al.), however, describes novel thermoplastic elastomer compositions from vegetable oil monomers and methods of making and using the same. In particular, thermoplastic block copolymers are described in the '383 Cochran et al. application which comprise a block of radically polymerizable monomer and a block of polymerized plant oil containing one or more triglyceride monomers.

In Cochran et al., the block copolymers in question are summarized as comprising at least one PA block and at least one PB block. The PA block represents a polymer block comprising one or more units of monomer A, and the PB block represents a polymer block comprising one or more units of monomer B. Monomer A is described as a vinyl, acrylic, diolefin, nitrile, dinitrile, or acrylonitrile monomer, while Monomer B is a radically polymerizable plant oil monomer containing one or more triglycerides. The vegetable oil triglycerides are discrete monomers comprising three fatty acid chains esterified to a glycerol backbone.

Cochran et al. as well contemplates a method of preparing a thermoplastic block copolymer or polymer block wherein a radically polymerizable plant oil monomer containing one or more triglyceride monomers is initially provided. This plant oil monomer is then radically polymerized, in the presence of an initiator added as a separate component and a transition-metal catalyst system to form a thermoplastic polymer. This thermoplastic polymer can itself be used as a thermoplastic elastomer, or can be used as a thermoplastic polymer block and further polymerized with other monomers to form a polymerized plant oil-based thermoplastic block copolymer.

The addition of styrene to polymerized triglycerides helps improve the processability, aids in the control of the melt state properties of polymers (glass transition temperature (Tg), elastic moduli, etc.) (Woof, R. P. & Sun, X. S., Bio-based polymers and composites (Academic Press, Burlington, Mass. 2005), which is hereby incorporated by reference in its entirety), and can serve as physical crosslinking sites below the glass transition temperature (Tg) of the polystyrene (100° C.). In a typical SBS elastomer, the styrene composition is about 10-30 wt % such that spherical or cylindrical styrene domains form in a matrix of butadiene. When the temperature is below the glass transition temperature of polystyrene (T=100° C.), the polybutadiene matrix is liquid but is bound between the vitreous polystyrene spheres, which serve as physical crosslinks. When the temperature is above the glass transition temperature of polystyrene, the entire elastomer system is molten and may be processed easily. Crosslinked poly(soybean oil) has been reported to have T values as low as −56° C. (Yang et al., Journal of Polymers and the Environment 19:189 (2011), which is hereby incorporated by reference in its entirety). Accordingly, polymerized soybean oil is an excellent candidate to serve as the liquid component in thermoplastic elastomers based on styrenic block copolymers, and polymers based on radically polymerizable renewable source-derived polymer oil macroinitiator containing one or more polymer oils comprise a significant improvement due to their crosslinked nature.

SUMMARY OF THE INVENTION

The present invention, in one aspect, concerns an improvement on Cochran et al., wherein thermoplastic block copolymers are provided which are prepared from radically polymerizable monomers A in common with Cochran et al. but macroinitiators comprising halogenated polymer oils from renewable source-derived oils and fats are used for the polymer block PB and obviate the need for an added separate initiator. In a further point of differentiation from Cochran et al., polymer block PB of the present invention comprises a multiblock architecture. The resulting multiblock polymers made from the macroinitiator of the present invention can provide thermosetting or thermoplastic polymers with certain properties, such as Number Average Molecular Weight, polydispersity index, and glass transition temperature that typically are associated with petroleum-based or -derived polymers as presently used in a wide variety of applications.

These polymer oil macroinitiators comprising halogenated polymerized renewable source-derived oils and fats are positioned to be used with atom transfer radical polymerization (ATRP) as contemplated by Cochran et al., but in contrast to the use of acrylated epoxidized vegetable oil triglyceride monomers described in Cochran et al., offer a number of advantages in the context of making renewable oil-based thermoplastic multiblock copolymers by ATRP according to a process otherwise generally as described in Cochran et al. In particular, acrylated epoxidized vegetable oil triglyceride monomers suffer from certain limitations as monomers, such as higher viscosities, and the processes employed in making polymers from acrylated epoxidized vegetable oil triglyceride monomers suffer from limitations such as the need for several steps, including hazardous and exothermic epoxidation.

However, these limitations are overcome in the present invention by the use of macroinitiators comprising renewable source-derived polymer oils. The polymer oils and fats used to synthesize the macroinitiators comprise at least one of heat-bodied oils, blown oils, and copolymer oils, collectively called "polymer oils" herein, and are characterized by molecular crosslinks occurring in the processes of making the blown oils, heat-bodied oils, copolymer oils, or hydrogenated derivatives of these. The polymer oils may be hydrogenated before or after making the blown oils, heat-bodied oils, copolymer oils. Thus, in contrast to acrylated epoxidized vegetable oil triglyceride monomers, the polymer oil macroinitiators of the present invention are cross-linked in the processes of making the blown oils, heat-bodied oils, copolymer oils prior to polymerization with monomer A or polymer block PA. As a result of the crosslinked structure of the polymer oils used to make the macroinitiators, block copolymers made from polymer oil macroinitiators can have high critical entanglement molecular weights (at which the properties maximize in respect to the viscosity of the molten polymer). The presence of more than one macroinitiator site on a given polymer oil monomer further enables the formation of multiblock copolymers with desirable properties such as elasticity, toughness, tackiness, and ease of melt-processing. What is meant by tackiness is the adhesive characteristic; higher tackiness corresponds to a greater degree of adhesiveness.

In another aspect, the present invention is concerned with thermoplastic multiblock copolymer elastomers prepared from radically polymerizable monomers and halogenated polymerized renewable source-derived oils and fats. The halogenated polymerized renewable source-derived oils and fats can be halogenated heat-bodied oils, halogenated blown oils, halogenated copolymer oils, or combinations of any thereof.

In another aspect, the present invention is concerned with methods of using halogenated polymerized renewable source-derived oil and/or fat-based thermoplastic polymers or block copolymers in various applications wherein petroleum-based thermoplastic polymers, block copolymers and block copolymer elastomers are presently used, such as for asphalt modifiers, in adhesives, rubber compositions, in the automobile industry, footwear, packaging, etc.

DETAILED DESCRIPTION OF EMBODIMENTS OF THE INVENTION

Multiblock copolymers contemplated by the present invention comprise at least one PA block and at least one PB block. The PA block represents a polymer block comprising one or more units of monomer A, and the PB block is a polymerized plant oil multiblock comprising at least one of a heat-bodied oil, a blown oil, a copolymer oil, a hydrogenated heat-bodied oil, a hydrogenated blown oil, or a hydrogenated copolymer oil.

The heat-bodied oil, blown oil, copolymer oil, hydrogenated heat-bodied oil, hydrogenated blown oil, or hydrogenated copolymer oil (collectively referred to as "polymer oils") are halogenated to form a halogenated heat-bodied oil, a halogenated blown oil, a halogenated copolymer oil, a halogenated hydrogenated heat-bodied oil, a halogenated hydrogenated blown oil, or a halogenated hydrogenated copolymer oil, respectively (collectively referred to as "halogenated polymer oils"). The halogenated polymer oil serves as a macroinitiator and a B multiblock in subsequent Atom Transfer Radical Polymerization, obviating the need to add a discrete initiator molecule.

The multiblock copolymer can be a linear or branched copolymer, and can contain two or more blocks. Exemplary copolymer architectures includes, but are not limited to (PA-PB)$_n$, (PA-PB)$_n$-PA, PB-(PA-PB)$_n$-, and (Pa$_{n'}$-PB)$_n$ where n and n' are greater than 0. For example, n ranges from 2 to 50, or from 2 to 10 and n' ranges from 0.01 to 200.

The PA block is made by polymerizing one or more radically polymerizable monomers, and has an average molecular weight of about 1 to about 300 kDa, or about 10 to about 30 kDa. The PA block may comprise repeating units of monomer A. For instance, the PA block can be a polymerized linear-chain or branched-chain monomer A or radicals thereof. The PB block is comprises one or more polymer oil, and has an average molecular weight of about 2 kDa to about 500 kDa, or about 6 to about 100 kDa. The PB block may comprise repeating units of polymer oil. For instance, the PB polymer oil block can be a polymerized linear-chain or branched-chain polymer oil or hydrogenated polymer oil, or radicals thereof.

PA-PB multiblock copolymers typically contain about 5 wt % to about 95 wt % of the polymerized A block and about 95 wt % to about 5 wt % of polymerized renewable source-derived polymer oil B multiblock. What is meant by multiblock is a B component that may have more than one site of polymerization initiation for addition of a PA block, resulting in one or more PA blocks per PB block.

The PA block of the block copolymer can be considered as a "hard" block, and has properties characteristic of thermoplastic substances in that it has the stability necessary for processing at elevated temperatures and yet possesses good strength below the temperature at which it softens. The PA block is polymerized from one or more radically polymerizable monomers, which can include a variety type of monomers such as vinyl, acrylic, diolefin, nitrile, dinitrile, or acrylonitrile monomer. Vinyl aromatic monomers are exemplary vinyl monomers that can be used in the block copolymer, and include any vinyl aromatics optionally having one or more substituents on the aromatic moiety. The aromatic moiety can be either mono- or polycyclic. Exemplary monomers for the PA block include styrene, a-methyl styrene, t-butyl styrene, vinyl xylene, vinyl naphthalene, vinyl pyridine, divinyl benzene, adiponitrile, methacrylonitrile, butadiene, isoprene, and mixtures thereof. Moreover, two or more different monomers can be used together in the formation of the PA block. A typical radically polymerizable monomer A used herein is styrene, and the resulting PA block is a styrene homopolymer.

The PB block of the block copolymer can be considered as a "soft" block, and has elastomeric properties which allow it to absorb and dissipate an applied stress and then regain its shape. The PB block comprises one or more renewable source-derived polymer oils and fats containing one or more triglycerides. The renewable source-derived polymer oils and fats used in the block copolymer can be any plant oil that is radically polymerizable, in particular those that contain one or more types of triglycerides, in particular drying oils.

The processes of the present disclosure for making radically polymerizable macroinitiators and for making block copolymers therefrom begin with polymerized oils.

Linseed (flaxseed), rapeseed, safflower, soybean, tall, oiticica, castor, marine organisms, single-cells, and algae are examples of the sources of desirable triglyceride monomers used as the starting materials for formation of polymerized oils. Any renewable source derived fat or oil may be incorporated into the triglyceride monomer starting materials, added to the polymer oils, or added to the macroinitiators of the present invention. Drying oils are preferred. Renewable source derived oil monomers comprise derivatives of common oil triglycerides. What is meant by vegetable oil monomer is a single triglyceride molecule. "Triglyceride," as defined herein, may refer to any unmodified triglyceride naturally existent in renewable source-derived oils and fats, including plant oil, microbial oil, or animal fat as well as any derivatives of unmodified triglycerides. An unmodified triglyceride may include any ester derived from glycerol with three similar or different fatty acids.

As previously mentioned, triglycerides are discrete monomers comprising three fatty acid chains esterified to a glycerol backbone. Typical commercially available renewable source derived oil monomers include oils from linseed (flaxseed), rapeseed, safflower, soybean, tall, oiticica, castor, marine organisms, single-cells, and algae; these can be rich in double bonds. Other renewable source derived oil monomers include animal fat, beef tallow, borneo tallow, butterfat, camelina oil, candlefish oil, canola oil, castor oil, cocoa butter, cocoa butter substitutes, coconut oil, cod-liver oil, colza oil, coriander oil, corn oil, cottonseed oil, false flax oil, flax oil, float grease from wastewater treatment facilities, hazelnut oil, hempseed oil, herring oil, illipe fat, jatropha oil, kokum butter, lanolin, lard, linseed oil, mango kernel oil, marine oils, meadowfoam oil, menhaden oil, milk fat, mowrah fat, mustard oil, mutton tallow, neat's foot oil, olive oil, orange roughy oil, palm oil, palm kernel oil, palm kernel olein, palm kernel stearin, palm olein, palm stearin, peanut oil, phulwara butter, pork lard, radish oil, ramtil oil, rapeseed oil, rice bran oil, safflower oil, sal fat, salicornia oil, sardine oil, sasanqua oil, sesame oil, shea fat, shea butter, soybean oil, sunflower seed oil, tall oil, tallow, tigernut oil, tsubaki oil, tung oil, triacylglycerols, triolein, used cooking oil, vegetable oil, walnut oil, whale oil, white grease, yellow grease, and derivatives, conjugated derivatives, genetically-modified derivatives, and mixtures of any thereof.

Conjugated triglycerides are defined as triglycerides containing one or more conjugated fatty acids (fatty acids containing at least one pair of conjugated double bonds). Exemplary conjugated fatty acids are conjugated linoleic acids, such as rumenic acid (9-cis, 11-trans-octadecadienoic acid); 10-trans, 12-trans-octadecadienoic acid; 10-trans, 12-cis-octadecadienoic acid; conjugated linolenic acid, such as alpha-eleostearic acid (9-cis, 11-trans, 13-trans octadecatrienoic acid); beta-eleostearic acid (9-trans, 11-trans, 13-trans octadecatrienoic acid); rumelenic acid (9-cis,11-trans,15-cis-octadecatrienoic acid); punicic acid (9-cis,11-trans,13-cis-octadecatrienoic acid); catalpic acid (9-trans, 11-trans, 13-cis-octadecatrienoic acid); alpha-calendic acid (8-trans, 10-trans, 12-cis octadecatrienoic acid); beta-calendic acid (8-trans, 10-trans, 12-trans octadecatrienoic acid); jacaric acid (8-cis, 10-trans, 12-cis octadecatrienoic acid); tetraenoic acids, such as alpha-parinaric acid (9-trans,11-cis, 13-cis, 15-trans-octadecatetraenoic acid); beta-parinaric acid (9-trans,11-trans,13-trans, 15-trans-octadecatetraenoic acid); 2-trans, 4-trans, 6-trans,11-cis octadecatetraenoic acid from rhibozium bacteria; pentaenoic acids, such as bosseopentaenoic acid (5-cis, 8-cis, 10-trans, 12-trans, 14 cis-pentaenoic acid); hexapentaenoic acid, such as 4-cis, 7-cis, 9-trans, 13-cis, 16-cis, 19-cis docosahexaenoic acid from marine algae. Triglyceride derivatives may include any triglyceride monomers that contain conjugated systems (i.e., a system of connected p-orbitals with delocalized electrons in triglycerides). A conjugated triglyceride monomer may contain a single conjugated site per triglyceride monomer. Alternatively, two or all three fatty-acid chains of the triglyceride monomer may contain one or more conjugated sites.

The multifunctional nature of highly unsaturated oils (drying oils) allows crosslinking of triglyceride monomers, leading to the formation of irreversibly crosslinked thermoset polymer oils, such as heat-bodied oil, blown oil, or copolymer oil. Soybean oil, for instance, is comprised of 86% of mono- and polyunsaturated fatty acid molecules containing the required double bonds for standard polymerization chemistry to produce polymerized oil macromolecules.

Examples of polymer oils prepared from renewable source-derived polyunsaturated oils include heat-polymerized (heat-bodied) oil (also known as stand oil), blown oil, and copolymer oil (Fox, F., Oils for Organic Coatings, in Federation Series on Coatings Technology, Unit Three, Federation of Societies for Paint Technology, Philadelphia, Pa., 1965, which is hereby incorporated by reference in its entirety). These polymer oils are widely available as products of commerce.

In the processes of converting triglyceride monomers into the blown oils, heat-bodied oils, or copolymer oils, intermolecular bonds are formed between renewable source derived triglyceride monomers. The resulting products often have higher viscosity than the starting triglyceride monomers and are inedible. In the formation of polymer oils, triglycerides form dimers, trimers, and oligomers, increasing entanglement (Paschke, R. F. and Wheeler, D. H., Inter- and Intramolecular Polymerization in Heat-Bodied Linseed Oil, J. Amer. Oil Chem. Soc. 31, pp. 208-211, 1954, which is hereby incorporated by reference in its entirety). In addition, intramolecular bonds are formed between fatty acids within triglyceride monomers, increasing the crosslinking of polymer oils with a resultant increase in critical entanglement molecular weight.

In heat-bodying, depending on the oil used, triglyceride monomers are heated and held at high temperature (an exemplary range is between about 288° C. to about 316° C.) to catalyze polymerization. Incubation with heat is continued until a product with a desired viscosity is obtained. Longer reaction times produce higher viscosity products due to increased levels of crosslinking, often by formation of six-membered rings containing a double bond; often the rings are intermolecular and join two triglyceride monomer molecules into a dimer. (Heat bodying of Drying Oils, J. Amer. Oil 27(11) 468-472, 1950). The viscosity of heat bodied oils is described using a scale with values ranging from P to $Z_9$. During the heat-bodying (heat-polymerization) reaction, the unsaturated triacylglycerols monomers react to form polymers, such as dimers and trimers. As polymerization takes place, the Iodine Value of the oil decreases due to the formation of new carbon-carbon bonds between triacylglycerol units at sites occupied by double bonds in the original triacylglycerols. Both intermolecular and intramolecular bonds are formed. Ester bonds between glycerol and fatty acids in the triglyceride monomers remain largely intact. The significant changes undergone by linseed oil as it is transformed by heat bodying from triglyceride monomers to a polymer oil have been summarized ("Linseed oil. Changes in physical and chemical properties during heat-bodying," Caldwell and Mattiello, Ind. Eng. Chem. 24(2) 158-162 1932, which is hereby incorporated by reference in its entirety). Heat bodied oils are inedible and are used in coatings such as quick drying enamel, oleoresin varnish, primers, lacquers, undercoats, flat paints, mastics, sealants, jointing pastes, printing inks, wood preservatives, rust inhibitor, and core oils. OKO M25™, OKO M37™, Alinco Y™ and Alinco Z2/Z3™ are examples of heat-bodied oils available from Archer Daniels Midland Company, Decatur Ill., USA.

Another method for polymerizing triglyceride monomers is by bubbling air through the oil while heating, usually with catalysts (so-called "drier catalysts") such as metal soaps, fatty acids, or salts of lead, manganese, and cobalt, to form "blown oils" with a broad variety of industrial applications. The oil is polymerized and partially oxidized and free hydroxyl groups are formed. For example, blown oils are prepared by polymerization and partial oxidation by bubbling air through a triglyceride monomer while heating to temperatures of about 110° C. (U.S. Pat. No. 7,842,746 to Bloom and Holzgraefe, issued Nov. 30, 2010: "Hydrogenated and Partially Hydrogenated Heat-Bodied Oils and Uses Thereof;" Fox, F., Federation Series on Coatings Technology, Unit Three (1965) pages 25-26, which are hereby incorporated by reference in their entirety). Blown triacylglycerol oils have carbon-carbon and ether linkages between triacylglycerol units. (Teng, G. et al., Surface Coatings International, Part B: Coatings Transactions 86(B3): 221-229 (2003), Abstract, which is hereby incorporated by reference in its entirety). The changes that take place when triglyceride monomers are converted into polymer oils by blowing has been summarized as follows: " . . . when linseed oil was blown with air at temperatures ranging between 100 and 200° and samples analyzed at intervals, the following facts were apparent. The viscosity, saponification number, density, acid number, hydroxyl number, and ethanol tolerance increased with an increase in time and temperature and, in addition, the degree of maturation and the drying time decreased . . . (189)" (Wexler, H. Polymerization of Drying Oils, Chemical Reviews 64(6) 591-611, 1964, citing Über geblasene Leinöle, Wilaborn and Morgner, Fette, Siefen, Anstrichmittel 57 178181 (1955) which are hereby incorporated by reference in their entirety). Inedible blown oils have traditionally been used in applications such as stuffing greases for leather, and applications in patent leather daubs, lithography, ink, plasticizers, alkyd resins, coatings, varnishes, caulks, putties, mastics, rust inhibitors, ceramic deflocculants, and for lubricants in which traditional triglyceride monomer oils would be less suitable. Blown Soya J-L™ is a blown soybean oil commercially available from Werner G. Smith Company, Cleveland, Ohio, USA.

Another method for polymerizing triglyceride monomers is by heat processing an unsaturated natural oil with at least one reactive comonomer such as styrene, vinyl toluene, maleic anhydride, or dicyclopentadiene to form "copolymer oils" (Copolymerization, J. Amer. Oil Chem. Soc. 27(11) 481-491 1950, hereby incorporated by reference in its entirety). A mixture of triglyceride monomers and reactive comonomer is heated to, for example 75-135° C., and may continue for 20-50 hours. Higher temperatures may lead to gel formation United States (U.S. Pat. No. 2,382,213, issued Aug. 14, 1945, hereby incorporated by reference in its entirety). Air or oxygen may be passed through the oil during the process. Renewable-source-based copolymer oils such as maleinized and dicyclopentadiene oils are characterized by a fast drying time and water resistance. Blending such copolymer oils with renewable oil monomer or modified oil monomers yields oil blends that also possess characteristic properties and provides more diversity of chemical properties. Toplin X-Z™ is a copolymer oil available from Archer Daniels Midland Company, Decatur Ill., USA.

Each of polymer oils, combinations of polymer oils with monomer oils, and macroinitiators may be partially or fully hydrogenated to reduce the number of double bonds in the oils. The term "hydrogenated" encompasses varying degrees of partial and full hydrogenation. Conducting partial hydrogenation allows the oils to retain some double bonds to provide useful sites for derivatization. The properties of polymers made from partially hydrogenated heat-bodied oils, blown oil, and/or copolymer oils can be selected or tuned by controlling the degree of hydrogenation of the oils. Careful selection of catalysts and conditions is necessary when hydrogenating macroinitiators to prevent displacement of the halogen component of the macroinitiator. A description of methods suitable for hydrogenation of renewable source-derived oils and fats is provided in the disclosure of previously cited U.S. Pat. No. 7,842,746. Typically, iodine value ("IV,") is used to quantify the double bonds in a composition. The IV of linseed oil triglyceride monomer varies from about 135 to about 175; The IV of a polymer oil of linseed (heat bodied linseed oil), for example, ranges from approximately 115-150. Although the physical characteristics of the composition can be determined empirically, the iodine values of the oil(s) can be used to quantify double bonds for any given embodiment of the present disclosure. When a triglyceride monomer, polymer oil, combination of polymer oil with monomer oil, or macroinitiator is hydrogenated, the IV of the composition decreases. Polymer oils or combinations of polymer oils with monomer oils may be hydrogenated before halogenation to provide a range of physical properties in block copolymers made therefrom. The IV values of the macroinitiators claimed herein may fall below about 110, in another embodiment below about 70, and in still another embodiment below about 30.

Renewable source derived triglyceride monomers may be subjected to certain reactions while maintaining their triglyceride structure. For example, hydrogenation is commonly carried out and removes double bonds. Polymer oils or halogenated polymer oil macroinitiators can be blended with unmodified or modified renewable source-derived fats and oil monomers. Further, epoxidation may be carried out to attach oxygen heteroatoms to one or more site of unsaturation of one or more fatty acid (fatty acyl) chains of oil monomers. Blending such unmodified or modified triglyceride monomers with polymerized oils or halogenated polymerize oil macroinitiators yields oil blends that possess characteristic properties and provide more diversity of chemical properties.

The radical polymerization of monomer A and B to form thermoplastic block copolymer can be performed through living free radical polymerization which involves living/controlled polymerization with free radical as the active polymer chain end (Moad et al., "The Chemistry of Radical Polymerization-Second Fully Revised Edition," Elsevier Science Ltd. (2006), which is hereby incorporated by reference in its entirety). This form of polymerization is a form of addition polymerization where the ability of a growing polymer chain to terminate has been removed. The rate of chain initiation is thus much larger than the rate of chain propagation. The result is that the polymer chains grow at a more constant rate than seen in traditional chain polymerization and their lengths remain very similar. One form of living free radical polymerization is atom transfer radical polymerization.

Atom transfer radical polymerization (ATRP) is a catalyzed, reversible redox process that achieves controlled polymerization via facile transfer of labile radicals (e.g., halide radicals) between growing polymer chains and a catalyst (Davis et al., "Atom Transfer Radical Polymerization of tert-Butyl Acrylate and Preparation of Block Copolymers," Macromolecules 33:4039-4047 (2000); Matyjaszewski et al., "Atom Transfer Radical Polymerization," Chemical Reviews 101:2921-2990 (2001), which are hereby incorporated by reference in their entirety). In conventional ATRP, chain termination and transfer reactions are essentially eliminated by keeping the free radical concentration small. Briefly, the mechanism by which ATRP operates may be summarized as:

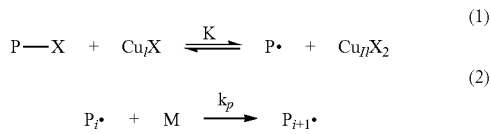

In Equation (1), the labile radical X may be a halogen (e.g., Br, Cl) attached to end of a polymer P. The catalyst, $Cu_IBr$, reversibly abstracts this halogen, forming a polymer free radical (P•). The equilibrium achieved between inert polymers and active polymer free radicals strongly favors the left side ($K \ll 10^{-8}$). Equation (2) is the standard free radical propagation reaction between a polymer of length i and a monomer M. The small free radical concentration ensured by equation (1) virtually eliminates termination reactions, and the halogen functionality is retained on polymers produced, which allows the production of multiblock copolymers from nearly any monomer amenable to conventional free radical polymerization.

The ATRP polymerization reaction starts with initiation. Initiation is conventionally accomplished by adding an agent capable of decomposing to form free radicals; the decomposed free radical fragment of the initiator attacks a monomer yielding a monomer-free radical, and ultimately produces an intermediate capable of propagating polymerization. These agents often are referred to as "initiators." The initiation is typically based on the reversible formation of growing radicals in a redox reaction between various transition metal compounds and an initiator. Suitable initiators depend greatly on the details of the polymerization, including the types of monomers being used, the type of catalyst system, the solvent system and the reaction conditions. Simple organic halides are typically used as model halogen atom transfer initiators. The present invention obviates the need for addition of a separate initiator.

For the polymerization of renewable source-derived oil or fat polymer oil blocks, self-initiation takes place due to the presence of the polymer oil macroinitiator, and a separate initiator is not needed. Moreover, for vinyl aromatic blocks such as styrene, thermal self-initiation can occur without the need for additional initiators.

In ATRP, the introduction of a catalyst system to the reaction media is required to establish the equilibrium between active states (active polymer free radicals for the growth of the polymer) and dormant states (the formed inert polymer). The catalyst is typically a transition metal compound being capable of participating in a redox cycle with the initiator and a dormant polymer chain. The transition-metal compound used in conventional ATRP is a transition-metal halide. Any transition metal that can participate in a redox cycle with the initiator and dormant polymer chain, but does not form a direct C-metal bond with the polymer chain, is suitable in the present invention. The exemplary transition metals include $Cu^{1+}$, $Cu^{2+}$, $Fe^{2+}$, $Fe^{3+}$, $Ru^{2+}$, $Ru^{3+}$, $Ru^{4+}$, $Ru^{5+}$, $Ru^{6+}$, $Cr^{+2}$, $Cr^{+3}$, $Mo^{0}$, $Mo^{1+}$, $Mo^{2+}$, $Mo^{3+}$, $W^{2+}$, $W^{3+}$, $Mn^{3+}$, $Mn^{4+}$, $Rh^{+}$, $Rh^{2+}$, $Rh^{3+}$, $Rh^{4+}$, $Re^{2+}$, $Re^{3+}$, $Re^{4+}$, $Co^{+}$, $Co^{2+}$, $Co^{3+}$, $V^{2+}$, $V^{3+}$, $V^{4+}$, $V^{5+}$, $Zn^{+}$, $Zn^{2+}$, $Au^{+}$, $Au^{2+}$, $Au^{3+}$, $Hg^{+}$, $Hg^{2+}$, $Pd^{0}$, $Pd^{+}$, $Pd^{2+}$, $Pt^{0}$, $Pt^{+}$, $Pt^{2+}$, $Pt^{3+}$, $Pt^{4+}$, $Ir^{0}$, $Ir^{+}$, $Ir^{2+}$, $Ir^{3+}$, $Ir^{4+}$, $Os^{2+}$, $Os^{3+}$, $Os^{4+}$, $Nb^{2+}$, $Nb^{3+}$, $Nb^{4+}$, $Nb^{5+}$, $Ta^{3+}$, $Ta^{4+}$, $Ta^{5+}$, $Ni^{0}$, $Ni^{+}$, $Ni^{2+}$, $Ni^{3+}$, $Nd^{0}$, $Nd^{+}$, $Nd^{2+}$, $Nd^{3+}$, $Ag^{+}$, and $Ag^{2+}$. A typical transition-metal catalyst system used herein is a copper (I) halide. The ligand serves to coordinate with the transition metal compound such that direct bonds between the transition metal and growing polymer radicals are not formed, and the formed copolymer material isolated. The ligand can be any N-, O-, P- or S-containing compound that coordinates with the transition metal to form a sigma-bond, any C-containing compound that coordinates with the transition metal to form a pi-bond, or any C-containing compound that coordinates with the transition metal to form a C-transition metal sigma-bond but does not form a C—C bond with the monomers under the polymerizing conditions. A typical ligand used herein is pentamethyldiethylenetriamine (PMDETA).

The state of the art of ATRP has been reviewed (Matyjaszewski et al.). More details for selection of initiators, catalysts/ligand systems for ATRP reaction can be found in U.S. Pat. No. 5,763,548 to Matyjaszewski et al. and U.S. Pat. No. 6,538,091 to Matyjaszewski et al., which are hereby incorporated by reference in their entirety.

In ATRP of styrene and polymer oil macroinitiator to prepare thermoplastic elastomers, polymerization can be carried out at a temperature of 120° C. or lower. The optimal temperature is the minimum at which polymerization can occur over reasonable time scales, e.g., 6-48 hours. In ATRP of polymer oil macroinitiators to make elastomers, advantages of macroinitiators of high molecular weight and a low glass transition temperature ($T_g$), and with the retention of the terminal halogen, allows the subsequent addition of a polystyrene block. Thus, high reaction temperatures as in conventional radical polymerizations are undesirable in ATRP of polymer oil macroinitiators. A typical reaction temperature for ATRP of styrene and BO, HBO or CPO macroinitiator oil is 140° C. or lower.

Parenthetically, benzyl bromide or benzyl chloride can be used as initiator in ATRP of styrene and polymer oil. CuX (where X=Br or Cl) can be used as the catalyst system and PMDETA can be used as the ligand. Typically, a 1:1 molar ratio of $Cu_I X$:PX is sufficient to establish the equilibrium between active and dormant states of the resulting polymers. $CuX_2$ can be used as a counter-catalyst to further reduce the polymer free radical concentration. Typically, a 0.1:1 molar ratio of counter-catalyst:catalyst and a 1:1 molar ratio of ligand:(catalyst and counter-catalyst) are desirable to ensure the solvation of the catalyst. The molecular weight of the resulting polymer is governed in part through the ratio, which may vary between 5:1 to 1000:1.

In the present invention, the degree of halogenation of a polymer oil dictates the number of macroinitiator sites, the molecular weight of resulting multiblock copolymers can be adjusted by adjusting the number of macroinitiation sites, the weight of monomer A, and the length of the polymerization reaction.

A solvent for the ATRP reaction is selected based the requirements of mutual polymer oil macroinitiator/polystyrene solubility and a normal boiling point compatible with the polymerization temperature. The solvent used in the ATRP of styrene and polymer oil macroinitiator may be toluene, THF, chloroform, cyclohexane, or a mixture thereof. A typical solvent used for ATRP of styrene and polymer oil macroinitiator oil is toluene. Monomer and macroinitiator concentration in the reactions depend partially on the solubility of the monomer, macroinitiator, and the polymer products as well as the evaporation temperature of the solvent. The concentration of monomers and macroinitiators dissolved in the solvent in the ATRP reactions may range from 5% to 100% (by weight of the sum of the monomers and the macroinitiator). Typically, the sum of monomer and macroinitiator concentrations in the solvent is less than 50% by weight to ensure the solubility of the resulting polymers and additionally to prevent premature gelation.

Controlled radical polymerization such as ATRP limits the number of initiation sites, drastically reduces the rate of chain transfer and termination reactions, and also introduces the capability to produce custom chain architectures such as block copolymers (BCPs). An advantage of applying ATRP to the polymerization of radically polymerizable renewable source-derived polymer oil macroinitiator containing one or more polymer oils is that the initiation of new chain branches from other growing chains is hindered. However, chain branching ultimately leading to gelation is still possible, and will proceed quickly if the polymerization rate or polymer concentration becomes too large. When the reactivities of a propagating chain towards all functional sites on both free monomers and repeating units that are already incorporated into a chain are identical, the general expectation is that the gel point will be reached at an extremely low conversion, such that, prior to gelation, the polymer of radically polymerizable renewable source-derived polymer oil macroinitiator containing one or more polymer oils has not yet achieved a degree of polymerization sufficient for useful mechanical properties to develop. This general expectation is supported by the past two decades of reports of thermosets from vegetable oils produced by conventional cationic and free radical polymerization.

In conventional ATRP, the introduction of $Cu_I X$ to the reaction media is required to establish the equilibrium between active and dormant states. Typically, a 1:1 molar ratio of $Cu_{II}X$:PX is sufficient to establish this equilibrium (Matyjaszewski et al., 2001). In some conventional systems, the equilibrium falls too far to the right and polymerization is uncontrolled unless the counter catalyst, $Cu_{II}X_2$, is introduced to control the equilibrium, which is independent of the reaction temperature (Behling et al., "Influence of Graft Density on Kinetics of Surface-Initiated ATRP of Polystyrene from Montmorillonite," Macromolecules 42:1867-1872 (2009); Behling et al., "Hierarchically Ordered Montmorillonite Block Copolymer Brushes," Macromolecules, 43(5): 2111-2114 (2010), which are hereby incorporated by reference in their entirety).

The present invention encompasses the discovery that halogenated polymer oils can be synthesized, and that they are useful as macroinitiators in ATRP. In the present invention, polymer oils or hydrogenated polymer oils are halogenated to form polymer oil macroinitiators having a halogen polymerization initiator incorporated into the B monomer. The halogen serves as an initiation site for polymerization to make block copolymers. The ratio of styrene monomer to macroinitiator sites on the polymer oil determines the molecular weight of the polystyrene block and can be adjusted to control the properties of block copolymers made therefrom.

Polymer oils or hydrogenated polymer oils made from renewable oils can be halogenated directly. When a polymer oil or hydrogenated polymer oil is halogenated, the halogen bound to the polymer oil serves as an initiation site for multiblock copolymerization. Suitable macroinitiator embodiments include a halogenated heat-bodied oil, a halogenated blown oil, a halogenated copolymer oil, a halogenated hydrogenated heat-bodied oil, a halogenated hydrogenated blown oil, and a halogenated hydrogenated copolymer oil. The ratio of polymer oil to halogen initiator sites determines the number of initiation points for formation of polystyrene blocks.

The quantities of initiator sites in the macroinitiators of the present invention can be controlled to adjust the properties of multiblock copolymers made from the macroinitiators. Macroinitiators having a higher number of halogen initiation sites per polymer oil can produce hard, glassy polymers useful as impact modifiers. Macroinitiators having a lower number of halogen initiation sites per polymer oil can produce solid rubbery type thermoplastic materials, with or without tackiness, and can be thermosetting under the proper conditions. To achieve a multiblock copolymer with rubber-like properties, the number of macroinitiation sites on the macroinitiator B block can be lower, or the polymer oil may be present as the majority phase. By using halogenated polymer oil as greater than half of the mass, the resulting high critical entanglement molecular weight provides a polystyrene-based block copolymer with desired properties.

The formation of the macroinitiator by halogenation can take place on any of at least three functional groups in polymer oil. In a first embodiment, fatty acid double bonds remaining after formation of the polymer are halogenated to form a macroinitiator. In a second embodiment, the macroinitiator is formed by halogenation of hydroxyl groups present in the polymer oil. In a third embodiment, alpha carbons of fatty acid moieties in polymer oils can be halogenated.

One measure of the molecular weight of a polymer is "Mn", which is the total weight of all the polymer molecules in a sample, divided by the total number of polymer molecules in the sample.

In a typical SBS elastomer, the styrene composition is about 10-30 wt % such that spherical or cylindrical styrene domains form in a matrix of butadiene. When the temperature is below the glass transition temperature of polystyrene ($T_g$=100° C.), the polybutadiene matrix is liquid ($T_g$<-90° C.) but is bound between the vitreous polystyrene spheres, which serve as physical crosslinks. When the temperature is above the glass transition temperature of polystyrene, the entire elastomer system is molten and may be processed easily. Crosslinked poly(soybean oil) has been reported to have $T_g$ values as low as -56° C. (Yang et al., "Conjugation of Soybean Oil and Its Free-Radical Copolymerization with Acrylonitrile," Journal of Polymers and the Environment 1-7 (2010), which is hereby incorporated by reference in its entirety).

Another aspect of the present invention relates to a method of preparing a thermoplastic block copolymer. The method comprises providing a radically polymerizable monomer, represented by A, or a polymer block PA comprising one or more units of monomer A. A radically polymerizable component B derived from a renewable source-derived oil or fat polymer oil macroinitiator, is also provided. Monomer A or the polymer block PA is then radically polymerized with component B, in the presence of the renewable source-derived oil or fat polymer oil macroinitiator and a transition-metal catalyst system to form the thermoplastic block copolymer.

After the radical polymerization, the polymerized renewable source-derived oil or fat-based block copolymer may be further catalytically hydrogenated to partially or fully saturate the renewable source-derived polymer oil block. This process removes reactive unsaturation from the rubbery component, yielding improved resistance to oxidative degradation, reduced crosslinkability and increased resistance to chemical attack. If carried out under selected conditions, hydrogenation may remove any remaining free halogen from the macroinitiator, promoting increased resistance to chemical attack.

Exemplary procedures for synthesizing poly(heat bodied oil) (PHBO), poly (blown oil, PBO) and poly(copolymer oil, PCPO) via ATRP with a polymer oil macroinitiator are presented in the examples which follow.

The degree of polymerization of polymer oil B multiblocks can be determined by gel permeation chromatography. The polymerization kinetics can be subsequently assessed and the parameters may be fine-tuned such that B blocks derived from polymer oil compounds can be reproducibly produced with minimal polydispersity and of targeted molecular weight. Parenthetically, the ratio of weight average molecular mass to the number average molecular mass is called polydispersity index, PDI, and is a measure of homogeneity of a polymer. In monodisperse polymers, the value of PDI is one. Polydisperse polymers have a wide range of molecular weights, so the value of PDI is greater than one. Differential scanning calorimetry is typically used to assess the glass transition temperatures ($T_g$) of polymers.

A further aspect of the present invention relates to a thermoplastic polymer comprising one or more units of a radically polymerizable renewable source-derived polymer oil or fat monomer containing one or more triglycerides. All above embodiments described for the PB block, such as compositions, structures, physical and chemical properties (e.g., molecular weight, glass transition temperature, etc.) are equally suitable for the polymerizable renewable source-derived polymer oil or fat-based thermoplastic polymers.

Another aspect of the present invention relates to a method of preparing a thermoplastic polymer or polymer block. The method comprises providing a radically polymerizable renewable source-derived polymer oil or fat macroinitiator containing one or more triglycerides. This renewable source-derived polymer oil or fat macroinitiator is then radically polymerized, in the presence of a transition-metal forming the catalyst system with the macroinitiator to form the thermoplastic polymer or polymer block. This thermoplastic polymer can itself be used as a thermoplastic elastomer. Alternatively, this thermoplastic polymer can be used as a polymer block, and can be further polymerized with other monomers to form a polymerized renewable source-derived polymer oil or fat-based thermoplastic block copolymer. All above embodiments described for methods of preparing the PB block, including reaction steps and reaction conditions (e.g., reaction reagents, catalyst systems, macroinitiators, temperatures, solvents, initiation and termination of the reaction, etc.) are suitable also for producing the polymerizable renewable source-derived polymer oil or fat-based thermoplastic polymers.

Other aspects of the present invention relate to the use of the polymerized renewable source-derived polymer oil or fat-based multiblock copolymers in a variety of applications. As exemplified below, the processes of the present invention can be controlled to produce hard, glassy polymers, thermosetting (crumb rubber) elastomers, or tacky type elastomers as desired. Exemplary applications of the block copolymers of the present invention include their use: as rubbers or elastomers; as toughened engineering thermoplastics; as asphalt modifiers; as resin modifiers; as engineering resins; as leather and cement modifiers; in footwear, such as in rubber shoe heels, rubber shoe soles; in automobiles, such as in tires, hoses, power belts, conveyor belts, printing rolls, rubber wringers, automobile floor mats, mud flaps for trucks, ball mill liners, and weather strips; as adhesives, such as pressure sensitive adhesives; in aerospace equipment; as viscosity index improvers; as detergents; as diagnostic agents and supports therefore; as dispersants; as emulsifiers; as lubricants and/or surfactants; as paper additives and coating agents; and in packaging, such as food and beverage packaging materials.

Uses for crumb rubber include flooring and rubber mats, highway construction and repair, recreation areas, auto bumpers, floor mats and liners, artificial athletic surfaces, stress-absorbing membrane interlayers, open-graded friction courses, paver placed surface seal, gap-graded mixtures, stone matrix asphalt, and crumb rubber modified asphalt (CRMA). CRMA, when added to asphalt, can impart improved resistance to oxidation, rutting, raveling, delamination and cracking.

In another aspect, a composition is provided comprising a polymerization macroinitiator, wherein the polymerization macroinitiator comprises at least one halogenated polymer oil selected from the group consisting of halogenated heat-bodied oil, a halogenated blown oil, a halogenated copolymer oil, a halogenated hydrogenated heat-bodied oil, a halogenated hydrogenated blown oil, a halogenated hydrogenated copolymer oil, and combinations of any thereof, wherein the polymer oil comprises at least one renewable source-derived oil or fat.

In another embodiment, a method for making the polymerization macroinitiator is provided, wherein a polymer oil having at least one double bond is halogenated. The halogenation may be carried out with the acid of a halogen to form a halogenated polymer oil macroinitiator. The halogenated sites in the oil can function as macroinitiators in subsequent polymerization, exemplified by Atom Transfer Radical Polymerization (ATRP) with styrene.

In an alternative embodiment, a method for making the polymerization macroinitiator is provided by halogenation of free hydroxyl groups of polymerized oil formed during oil polymerization (heat-bodying oil, blowing oil, or forming copolymer oil) is carried out with a halogenated acylhalogen, exemplified by bromoacetyl chlorine or bromoacetyl bromine. Free hydroxyl groups may be formed from double bonds in the fatty acyl chain or at the glycerol moiety of oils by the hydrolysis of an ester bond between the glycerol and the fatty acyl chain.

In yet another embodiment, a method for making the polymerization macroinitiator is provided by halogenation at alpha carbons of component fatty acid moieties.

In a further embodiment, the polymer oil is made from a renewable source derived fat or oil selected from the group consisting of algal oil, animal fat, beef tallow, borneo tallow, butterfat, camelina oil, candlefish oil, canola oil, castor oil, cocoa butter, cocoa butter substitutes, coconut oil, cod-liver oil, colza oil, coriander oil, corn oil, cottonseed oil, false flax oil, flaxseed oil, float grease from wastewater treatment facilities, hazelnut oil, hempseed oil, herring oil, illipe fat, jatropha oil, kokum butter, lanolin, lard, linseed oil, mango kernel oil, marine oils, meadowfoam oil, menhaden oil, microbial oil, milk fat, mowrah fat, mustard oil, mutton tallow, neat's foot oil, oiticica oil, olive oil, orange roughy oil, palm oil, palm kernel oil, palm kernel olein, palm kernel stearin, palm olein, palm stearin, peanut oil, phulwara butter, pile herd oil, plant oil, pork lard, radish oil, ramtil oil, rapeseed oil, rice bran oil, safflower oil, sal fat, salicornia oil, sardine oil, sasanqua oil, sesame oil, shea fat, shea butter, single-cell oil, soybean oil, sunflower seed oil, tall oil, tallow, tigernut oil, tsubaki oil, tung oil, triacylglycerols, triolein, used cooking oil, vegetable oil, walnut oil, whale oil, white grease, yellow grease, and derivatives, conjugated derivatives, genetically-modified derivatives, and combinations of any thereof.

In another embodiment, the polymer oil is made from a renewable source derived fat or oil containing one or more conjugated fatty acids selected from the group consisting of conjugated linoleic acids, rumenic acid (9-cis, 11-trans-octadecadienoic acid), 10-trans, 12-trans-octadecadienoic acid, 10-trans, 12-cis-octadecadienoic acid, conjugated linolenic acid, alpha-eleostearic acid (9-cis, 11-trans, 13-trans octadecatrienoic acid), beta-eleostearic acid (9-trans, 11-trans, 13-trans octadecatrienoic acid), rumelenic acid (9-cis,11-trans,15-cis-octadecatrienoic acid), punicic acid (9-cis,11-trans,13-cis-octadecatrienoic acid), catalpic acid (9-trans, 11-trans, 13-cis-octadecatrienoic acid), alpha-calendic acid (8-trans, 10-trans, 12-cis octadecatrienoic acid), beta-calendic acid (8-trans, 10-trans, 12-trans octadecatrienoic acid), jacaric acid (8-cis, 10-trans, 12-cis octadecatrienoic acid), tetraenoic acids, alpha-parinaric acid (9-trans,11-cis,13-cis, 15-trans-octadecatetraenoic acid), beta-parinaric acid (9-trans,11-trans,13-trans, 15-trans-octadecatetraenoic acid), 2-trans, 4-trans, 6-trans, 11-cis octadecatetraenoic acid from rhibozium bacteria, pentaenoic acids, bosseopentaenoic acid (5-cis, 8-cis, 10-trans, 12-trans, 14 cis-pentaenoic acid), hexaenoic acid, 4-cis, 7-cis, 9-trans, 13-cis, 16-cis, 19-cis docosahexaenoic acid from marine algae, and combinations of any thereof.

In another embodiment, a polymer made from polymerization macroinitiator comprising halogenated renewable source derived polymer oils is taught, wherein the macroinitiator comprises at least one of halogenated heat-bodied oil, a halogenated blown oil, a halogenated copolymer oil, a halogenated hydrogenated heat-bodied oil, a halogenated hydrogenated blown oil, a halogenated hydrogenated copolymer oil, and combinations of any thereof. In an embodiment, the polymer comprises a hard glassy polymer. In an embodiment, the hard glassy polymer comprises an impact modifier. In a further embodiment, the impact modifier can be incorporated into at least one of molded plastic, extruded plastic, acrylonitrile butadiene styrene, polyvinyl halide products, nylons, polyesters, polypropylene alloys, chlorinated polyethylenes, polycarbonates, polystyrenes, acrylics, and combinations of any thereof. In another embodiment, the polymer comprises a thermoset polymer. In a further embodiment, the thermoset polymer is suitable for use in an application selected from the group consisting of flooring, rubber mats, highway construction, highway repair, recreation areas, automobile bumpers, automobile floor mats, automobile liners, tires, hoses, power belts, conveyor belts, artificial athletic surfaces, stress-absorbing membrane interlayers, open-graded friction courses, paver placed surface seal, gap-graded mixtures, stone matrix asphalt, crumb rubber modified asphalt, toughened engineering thermoplastics, asphalt modifiers, resin modifiers, engineering resins, leather and cement modifiers, in footwear, in rubber shoe heels, rubber shoe soles, in printing rolls, rubber wringers, mud flaps for trucks, ball mill liners, weather strips, adhesives, pressure sensitive adhesives, in aerospace equipment, as viscosity index improvers, detergents, diagnostic agents, dispersants, emulsifiers, lubricants, surfactants, paper additives, coating agents, paper coating agents, food packaging, beverage packaging, and combinations of any thereof. In yet another embodiment, the polymer comprises a thermoplastic elastomer. In a further embodiment the thermoplastic elastomer may be incorporated into at least one of binders, asphalt binders, tackifiers, flooring, rubber mats, highway construction, highway repair, recreation areas, automobile bumpers, automobile floor mats, automobile liners, tires, hoses, power belts, conveyor belts, artificial athletic surfaces, stress-absorbing membrane interlayers, open-graded friction courses, paver placed surface seal, gap-graded mixtures, stone matrix asphalt, crumb rubber modified asphalt, toughened engineering thermoplastics, asphalt modifiers, resin modifiers, engineering resins, leather and cement modifiers, in footwear, in rubber shoe heels, rubber shoe soles, in printing rolls, rubber wringers, mud flaps for trucks, ball mill liners, weather strips, adhesives, pressure sensitive adhesives, in aerospace equipment, as viscosity index improvers, detergents, diagnostic agents, dispersants, emulsifiers, lubricants, surfactants, paper additives, paper coating agents, food packaging, beverage packaging, and combinations of any thereof. In a still further embodiment, the polymer may comprise comprises at least one A block made from monomers selected from the group consisting of styrene, alpha-methyl styrene, t-butyl styrene, vinyl xylene, vinyl naphthalene, vinyl pyridine, divinyl benzene, methyl acrylate, C1-C6 (meth)acrylate, methyl methacrylate, ethyl methacrylate, propyl (meth)acrylate, butyl (meth)acrylate, heptyl (meth)acrylate, hexyl (meth)acrylate), acrylonitrile, adiponitrile, methacrylonitrile, butadiene, isoprene, a vinyl aromatic monomer, a polystyrene homopolymer, and combinations of any thereof. In yet another embodiment, the polymer may be further subjected to vulcanization, cross-linking, compatibilizing, compounding with one or more other materials, and combinations of any thereof.

In one embodiment of the present invention, the thermoplastic and elastomeric block copolymer has a PA-PB multiblock polymer architecture, where the PA block is a linear-chain polystyrene (PS) and the PB multiblock is a polymer oil (PO) or radicals thereof. The PO may be at least one of a blown oil (BO), a heat-bodied oil (HBO), a copolymer oil (CPO) a hydrogenated blown oil (BO), a hydrogenated heat-bodied oil (HBO), or a hydrogenated copolymer oil (CPO). The PS-PO di-block copolymer thus has an elastomeric block comprising a B multiblock made from a polymer oil macroinitiator, and one PS block bonded to one macroinitiation site of the PO B block. The block copolymer has a molecular weight (Mn) ranging from 1 kDa to 500 kDa, for instance, from about 10 kDa to 300 kDa, from about 40 to about 100 kDa, or from about 80 to about 100 kDa and a first glass transition temperature ($T_g$) below −15° C., for instance, from about −60° C. to about −20° C.

In one embodiment of the present invention, the thermoplastic and elastomeric block copolymer has a PA-PB-PA triblock polymer architecture, where the PA block is a linear-chain polystyrene (PS), and the PB multiblock is a polymer oil (PO) or radical thereof. This polymer oil-based styrenic triblock copolymer (PS-PO-PS) thus has an elastomeric interior block comprising a B multiblock made from a polymer oil macroinitiator having PS blocks bonded to two macroinitiation sites, and a thermoplastic outer block PS formed bonded to two macroinitiation sites of the interior block PO. The PS-PO-PS tri-block copolymer has a molecular weight ranging from 7 kDa to 1000 kDa, for instance, from about 7 kDa to about 500 kDa, from about 15 kDA to about 350 kDa, from about 80 kDa to about 120 kDa or from about 100 kDa to about 120 kDa. The triblock copolymer may have a first $T_g$ below −15° C., for instance, from about −60° C. to about −28° C.

In another embodiment of the present invention, the thermoplastic and elastomeric block copolymer has a multiblock polymer architecture comprising three or more PA blocks comprising linear-chain polystyrenes (PS), and the PB multiblock is a polymer oil (PO) or radical thereof having at least three macroinitiation sites. This polymer oil-based styrenic multiblock copolymer thus has an elastomeric interior block comprising a B multiblock made from a polymer oil macroinitiator, and three or more thermoplastic outer PS blocks formed bonded to the interior multiblock PO.

In one embodiment, the radical polymerizing is carried out by atom transfer radical polymerization with a polymer oil macroinitiator. The polymer oil is selected from at least one of a halogenated blown oil (BO), a halogenated heat-bodied oil (HBO), a halogenated copolymer oil (CPO), a halogenated hydrogenated blown oil (BO), a halogenated hydrogenated heat-bodied oil (HBO), and a halogenated hydrogenated copolymer oil (CPO).

In an alternative embodiment of the present invention, a block copolymer derived from a renewable source derived fat or oil comprises an impact modifier useful in molded plastic, extruded plastic, PVC products, nylons, polyesters, polypropylene alloys, chlorinated polyethylenes, polycarbonates, polystyrenes, and acrylics.

Some embodiments of the present invention relate to methods of making a thermoplastic multiblock copolymer comprising at least one polymer block of radically polymerizable monomer and a polymer block of radically polymerized renewable source-derived polymer oil or fat containing one or more triglyceride polymer oils, according to the above-described steps. The A block radically polymerizable monomers used in this method include, but are not limited to, styrene, α-methyl styrene, t-butyl styrene, vinyl, vinyl xylene, vinyl naphthalene, vinyl pyridine, divinyl benzene, methyl acrylate, $C_1$-$C_6$ (meth)acrylate (i.e., methyl methacrylate, ethyl methacrylate, propyl (meth)acrylate, butyl (meth)acrylate, heptyl (meth)acrylate, or hexyl (meth)acrylate), acrylonitrile, adiponitrile, methacrylonitrile, butadiene, isoprene, a vinyl aromatic monomer, a polystyrene homopolymer, a diolefin, a nitrile, a dinitrile, or mixtures thereof. In one embodiment, the polymerized vinyl monomer is a vinyl aromatic monomer, for instance, a polystyrene homopolymer. In one embodiment, the polymer oil macroinitiator is made from blown oil. The polymer oil macroinitiator is made from a polymer oil.

Alternatively, the method of the present invention may comprise the following steps: a) ATRP of styrene homopolymer (PS), using a polymer oil derived macroinitiator in a solvent suitable for the mutual dissolution of PS and the macroinitiator, to yield a multiblock copolymer. In one embodiment, the method is carried out in the presence of a solvent, without a counter-catalyst. The polymerization can be carried out at a temperature ranging from 65 to 120° C. The solvent concentration can range from 5% to 90% by mass ratio of the solvent to the macroinitiator B.

In some embodiments, the polymerized renewable source-derived polymer oil-based multiblock copolymers of the present invention can be used as a main component in a thermoplastic elastomer composition, to improve the thermoplastic and elastic properties of the composition. To form an elastomeric composition, the multiblock copolymer can be further vulcanized, cross-linked, compatibilized, and/or compounded with one or more other materials, such as other elastomers, additives, modifiers and/or fillers. The resulting elastomer can be used as a rubber composition, in various industries such as in footwear, automobiles, packaging, etc.

In one particular embodiment of one of the above-mentioned possible applications, the polymerized renewable source-derived polymer oil based multiblock copolymers of the present invention can be used in an asphalt composition, as an asphalt additive, modifier and/or filler at from 1 to 5 weight percent of the composition. The asphalt composition may further comprise a bitumen component.

In another particular embodiment, the polymerized renewable source-derived polymer oil based block copolymers can be used in a toughened engineering thermoplastic composition. These toughened engineering thermoplastic composition typically comprise predominantly a glassy or semi-crystalline component with a minority of a rubbery or elastomeric component to increase the toughness (reduce the brittleness) of the material, e.g. analogous to High-Impact Polystyrene (HIPS). To form a toughened engineering thermoplastic composition, the multiblock copolymer of the present invention may be formulated such that the renewable source-derived polymer-oil block is a minority component and serves to absorb energy that would otherwise lead to the fracture of the solid matrix. The block copolymer in the toughened engineering thermoplastic composition may be further compounded as is conventional with other materials, such as other engineering thermoplastics, additives, modifiers, or fillers.

All the above embodiments described for applications of the polymerized renewable source-derived polymer oil or fat-based thermoplastic block copolymers are also suitable applications of the renewable source-derived polymer oil based thermoplastic polymers.

The present invention is further demonstrated by the non-limiting examples that follow:

EXAMPLES

Example 1

Synthesis of a Heat-Bodied Linseed Oil Macroinitiator

Heat-bodied linseed oil (20 g) (OKO M25, ADM Red Wing MN) were combined with 33% hydrobromic acid in acetic acid (37 mL) (Aldrich) and toluene (20 mL) (Fisher) in a 100 mL round bottom flask. The mixture was stirred at room temperature with a magnetic stir bar and stir plate under a nitrogen atmosphere for 18 h to halogenate the heat-bodied linseed oil. After the halogenation, the mixture was washed three times with water and the toluene was removed by rotary evaporation. The resulting brominated oil was characterized by 1H-NMR and was found to have 1.32 bromine per triglyceride repeat unit.

Example 2

Atom Transfer Radical Polymerization Synthesis of Styrene/Polymer Oil Copolymer Using a Polymer Oil Macroinitiator to Form Hard Glassy Polymers.

Various ratios of halogenated polymer oil (polymerized linseed oil) macroinitiator, styrene, copper(I) chloride, copper metal, pentamethyldiethylene triamine were combined with 20 mL toluene in a 100 mL Schlenk flask (Table 2.1). No halogen initiator was added to the reaction mixtures. The reaction mixtures were subjected to three freeze/pump/thaw cycles to remove oxygen (frozen with liquid nitrogen, pumped down to 133.322 Pascal (1 torr) pressure, sealed with the stopcock and allowed to thaw). The flask was then flushed with nitrogen through a nitrogen line equipped with a bubbler. Each reaction mixture was stirred with a magnetic stir bar on a stir plate and heated to 110° C. for 16 h to conduct atom transfer radical polymerization. After the reaction, the product mixtures were poured into stirring methanol to precipitate the resulting polymer and the polymer was collected by filtration. The solid polymer was then redissolved in methylene chloride and filtered to remove the copper. The filtrate was then poured into stirring methanol to precipitate the polymer. The polymer was collected by filtration and dried under vacuum.

TABLE 2.1

Components of polymerization of halogenated heat-bodied linseed oil.

| Run | BrBLO (g) | Styrene (mL) | CuCl (g) | Cu | PMDETA (mL) |
|---|---|---|---|---|---|
| 1 | 1.0442 | 3.3546 | 0.1148 | 0.0775 | 0.5093 |
| 2 | 0.6677 | 3.8070 | 0.0370 | 0.0440 | 0.2890 |
| 3 | 0.3871 | 3.9862 | 0.0180 | 0.0307 | 0.2017 |

BrBLO = Brominated OKO M25 ™ Heat-bodied linseed oil; CuCl = Copper(I) chloride; PMDETA = pentamethyldiethylenetriamine.

In this example, polymerization of halogenated heat-bodied linseed oil took place without an added initiator, such as bromine. The resulting polymers from runs 1-3 were hard glassy polymers at ambient temperatures, potentially useful as impact resistant polymers (like acrylonitrile butadiene styrene, ABS) or impact modifiers to increase the durability of molded or extruded plastics by reducing low temperature embrittlement in PVC products, nylons, polyesters, polypropylene alloys, chlorinated polyethylenes, polycarbonates, polystyrenes, and acrylics.

Example 3

Synthesis of Macroinitiator and Atom Transfer Radical Polymerization Synthesis of Styrene/Polymer Oil Copolymer Using the Polymer Oil Macroinitiator to Form Thermoplastic Crumb Rubbers and Thermoset Polymers.

Heat-bodied linseed oil (OKO M37™, 20 g) was brominated substantially as described in example 1, except 0.8 mL 33% hydrobromic acid in acetic acid (37 mL) and 100 mL toluene were used. The mixture was refluxed and stirred under a nitrogen atmosphere for 2 h, then washed three times with water and the toluene removed by rotary evaporation. The resulting brominated oil was characterized by 1H-NMR and was found to have 0.35 bromine per triglyceride repeat unit (by 1H-NMR).

Polymerization

The brominated heat-bodied vegetable oil was polymerized by ATRP substantially as outlined in Example 2 with varying ratios of halogenated polymerized linseed oil, styrene, copper(I) chloride, copper metal, pentamethyldiethylene triamine (Table 3.1).

TABLE 3.1

Components of polymerization of halogenated heat-bodied linseed oil.

| Run | BrBLO (g) | Styrene (mL) | CuCl (g) | Cu | PMDETA (mL) |
|---|---|---|---|---|---|
| 4 | 3.1143 | 0.9744 | 0.1092 | 0.0225 | 0.1228 |
| 5 | 2.5497 | 1.5954 | 0.0732 | 0.0184 | 0.1005 |
| 6 | 2.1584 | 2.0259 | 0.0525 | 0.0156 | 0.0851 |

BrBLO = Brominated OKO M25 ™ Heat-bodied linseed oil; CuCl = Copper(I) chloride; PMDETA = pentamethyldiethylenetriamine.

Copolymerization of brominated heat-bodied linseed oil macroinitiator and styrene by ATRP under these conditions resulted in thermoplastic solid rubbery type materials suitable for crumb rubber applications. Greater than 50% of the mass originated from the brominated heat-bodied linseed oil. The copolymers retained the drying properties of the bodied linseed oil and crosslinked on overnight exposure to air to make thermoset elastomers.

Example 4

Synthesis of Macroinitiator and Atom Transfer Radical Polymerization Synthesis of Styrene/Polymer Oil Copolymer Using the Polymer Oil Macroinitiator to Form Tacky Thermoplastic Elastomers Heat-bodied linseed oil (OKO M37™, 20 g) was brominated substantially as described in example 1, except 0.35 mL 33% hydrobromic acid in acetic acid (37 mL) and 100 mL toluene were refluxed in a 250 mL round bottom flask with a magnetic stir bar and stir plate under a nitrogen atmosphere for 2 h. The mixture was then washed three times with water and the toluene removed by rotary evaporation. The resulting brominated oil was characterized by 1H-NMR and was found to contain 0.1 bromine per triglyceride repeat unit.

Polymerization

The brominated heat-bodied vegetable oil was polymerized substantially as outlined in Example 2 with varying ratios of halogenated polymerized linseed oil, styrene, copper(I) chloride, copper metal, and PMDETA. The reaction mixtures were poured into stirring methanol to precipitate the resulting polymers and the polymers collected by filtration. The solid polymers were then redissolved in varying amounts of toluene and 100 ppm of antioxidant (Butylated hydroxytoluene, BHT) was added (Table 4.1). Number Average Molecular Weight (Mn) and Polydispersity Index (PDI) were determined by gel permeation chromatography. Glass transition temperature (Tg) was determined by Differential Scanning Calorimetry (Table 4.2).

TABLE 4.1

Components of polymerization of halogenated heat-bodied linseed oil.

| Run | BrBLO (g) | Styrene (mL) | CuCl (g) | PMDETA (mL) | Toluene (mL) |
|---|---|---|---|---|---|
| 7 | 3.1523 | 0.97 | 0.10506 | 0.15 | 16.70 |
| 8 | 2.5511 | 1.60 | 0.07638 | 0.12 | 13.51 |
| 9 | 2.1622 | 2.00 | 0.05400 | 0.10 | 11.45 |

BrBLO = Brominated OKO M25 ™ Heat-bodied linseed oil; CuCl = Copper(I) chloride; PMDETA = pentamethyldiethylenetriamine.

TABLE 4.2

Characteristics of starting material polymers produced in runs 7-9.

| Run | Description | $<M_n>$ g/mol | PDI | 1st $T_g$ (° C.) | 2nd $T_g$ (° C.) |
|---|---|---|---|---|---|
|  | Starting material | 8,300 | 9.21 | NA | NA |
| 7 | Thermoplastic elastomer (Tacky solid) | 10,300 | 6.19 | −29 | $T_m$ at 66 |
| 8 | Thermoplastic elastomer (rubbery solid | 13,200 | 4.95 | −24 | 76 |
| 9 | Thermoplastic elastomer (rubbery solid) | 13,400 | 4.37 | −25 | 80 |

Starting material = Brominated OKO M25 ™ Heat-bodied linseed oil; Mn g/mol = Number Average Molecular Weight; PDI = Polydispersity index; Tg = Glass transition temperature.

In the polymers described in this example, greater than 50% of the mass originated from the brominated heat-bodied linseed oil. Copolymerization of brominated heat-bodied linseed oil macroinitiator and styrene by ATRP under these conditions resulted in tacky thermoplastic elastomers or solid rubbery type materials suitable for melt processing into finished goods. These properties could be selected by adjusting the ratio of styrene to the renewable source derived polymer oil macroinitiator. By decreasing the ratio of a monomer (styrene) to the B multiblock, tackifiers with a wide range of potential applications were formed. In polymers formed with a higher ratio of A monomer to the B macroinitiator, thermoplastic elastomers were formed as in Example 3, but the crosslinking and formation of thermoset elastomers was prevented by the addition of an antioxidant (BHT).

What is claimed is:

1. A composition comprising a polymerization macroinitiator, wherein the polymerization macroinitiator comprises at least one halogenated polymer oil selected from the group consisting of halogenated heat-bodied oil, a halogenated blown oil, a halogenated copolymer oil, a halogenated hydrogenated heat-bodied oil, a halogenated hydrogenated blown oil, a halogenated hydrogenated copolymer oil, and combinations of any thereof, wherein the polymer oil comprises at least one renewable source-derived oil or fat.

2. A method for making the polymerization macroinitiator of claim 1 comprising,
providing a polymer oil having at least one double bond; and,
halogenating at least one double bond of the polymer oil.

3. A method for making the polymerization macroinitiator of claim 1 comprising,
providing a polymer oil having at least one free hydroxyl group; and,
halogenating at least one hydroxyl group of the polymer oil.

4. A method for making the polymerization macroinitiator of claim 1 comprising,
providing a polymer oil; and,
halogenating at least one alpha carbon in at least one fatty acid moiety of the polymer oil.

5. The composition of claim 1 wherein the polymer oil is made from a renewable source derived fat or oil selected from the group consisting of algal oil, animal fat, beef tallow, borneo tallow, butterfat, camelina oil, candlefish oil, canola oil, castor oil, cocoa butter, cocoa butter substitutes, coconut oil, cod-liver oil, colza oil, coriander oil, corn oil, cottonseed oil, false flax oil, flaxseed oil, float grease from wastewater treatment facilities, hazelnut oil, hempseed oil, herring oil, illipe fat, jatropha oil, kokum butter, lanolin, lard, linseed oil, mango kernel oil, marine oils, meadowfoam oil, menhaden oil, microbial oil, milk fat, mowrah fat, mustard oil, mutton tallow, neat's foot oil, oiticica oil, olive oil, orange roughy oil, palm oil, palm kernel oil, palm kernel olein, palm kernel stearin, palm olein, palm stearin, peanut oil, phulwara butter, pile herd oil, plant oil, pork lard, radish oil, ramtil oil, rapeseed oil, rice bran oil, safflower oil, sal fat, salicornia oil, sardine oil, sasanqua oil, sesame oil, shea fat, shea butter, single-cell oil, soybean oil, sunflower seed oil, tall oil, tallow, tigernut oil, tsubaki oil, tung oil, triacylglycerols, triolein, used cooking oil, vegetable oil, walnut oil, whale oil, white grease, yellow grease, and derivatives, conjugated derivatives, genetically-modified derivatives, and combinations of any thereof.

6. The composition of claim 1 wherein the polymer oil is made from a renewable source derived fat or oil containing one or more conjugated fatty acids selected from the group consisting of conjugated linoleic acids, rumenic acid (9-cis, 11-trans-octadecadienoic acid), 10-trans, 12-trans-octadecadienoic acid, 10-trans, 12-cis-octadecadienoic acid, conjugated linolenic acid, alpha-eleostearic acid (9-cis, 11-trans, 13-trans octadecatrienoic acid), beta-eleostearic acid (9-trans, 11-trans, 13-trans octadecatrienoic acid), rumelenic acid (9-cis,11-trans,15-cis-octadecatrienoic acid), punicic acid (9-cis,11-trans,13-cis-octadecatrienoic acid), catalpic acid (9-trans, 11-trans, 13-cis-octadecatrienoic acid), alpha-calendic acid (8-trans, 10-trans, 12-cis octadecatrienoic acid), beta-calendic acid (8-trans, 10-trans, 12-trans octadecatrienoic acid), jacaric acid (8-cis, 10-trans, 12-cis octadecatrienoic acid), tetraenoic acids, alpha-parinaric acid (9-trans,11-cis,13-cis, 15-trans-octadecatetraenoic acid), beta-parinaric acid (9-trans,11-trans,13-trans, 15-trans-octadecatetraenoic acid), 2-trans, 4-trans, 6-trans, 11-cis octadecatetraenoic acid from rhibozium bacteria, pentaenoic acids, bosseopentaenoic acid (5-cis, 8-cis, 10-trans, 12-trans, 14 cis-pentaenoic acid), hexaenoic acid, 4-cis, 7-cis, 9-trans, 13-cis, 16-cis, 19-cis docosahexaenoic acid from marine algae, and combinations of any thereof.

* * * * *